Oct. 11, 1966     G. S. BELL     3,278,340

DEFORMATION-SAFE DRY CELL

Filed May 27, 1963

INVENTOR.
GLAISTER S. BELL
BY Gerard J. Weiser
ATTORNEY.

United States Patent Office 3,278,340
Patented Oct. 11, 1966

3,278,340
DEFORMATION-SAFE DRY CELL
Glaister S. Bell, Ellwangen (Jagst), Germany, assignor to Varta-Pertrix-Union G.m.b.H., Ellwangen (Jagst), Germany, a corporation of Germany
Filed May 27, 1963, Ser. No. 283,244
Claims priority, application Germany, June 1, 1962, P 29,526
11 Claims. (Cl. 136—178)

The present invention relates to primary battery cells, and more particularly to a pressure-sensitive degassing valve built into alkaline dry cells to make them safe against deformation.

Polarization may be reduced in primary battery cells by decreasing their amperage. This has been done primarily by increasing the active electrode surfaces. However, this causes increased reaction velocity between the metal of the anode and the electrolyte, thus increasing the corrosion thereof even when the battery is not in operation.

If some of the reaction products are gaseous, it becomes most difficult to seal the cell properly and yet to prevent undue accumulation of gases within the sealed cell. If this accumulation exceeds the air space in the cell, the cell container will be deformed or the sell may even burst.

A good example of this type of cell is the class of alkaline dry cells using a powdered zinc anode with a depolarizing cathode of manganese dioxide, mercuric oxide, or silver oxide. Such cells are described, for instance, on pages 304 to 323 of "Primary Batteries," by George Wood Vinal, John Wiley & Sons, Inc., New York, 1950, and the herein disclosed improvements are applicable to these types of cells. The electrolyte of these cells consists of a concentrated aqueous solution of an alkali metal hydroxide, such as potassium hydroxide which may contain an addition of zinc oxide. They usually have the active battery assembly contained in a steel jacket. To reduce corrosion, the powdered zinc anode is usually amalgamated with about 10%, by weight, of mercury.

Experience has shown that there is danger of deformation or explosion of such cells even when the greatest care is taken in the manufacture thereof and in the selection of their component materials. Particularly at elevated temperatures, the danger of explosion arises even before discharge. If bursting of the cell jacket is avoided, deformation often is so severe that the cell is useless for the intended purpose. Often, the battery cell has been built to fit into a narrow space of an apparatus and its deformation makes it not only useless but also impossible to remove from the narrow space without disassembling the entire apparatus. Furthermore, if the cell seal is broken, the entering air will further accelerate the corrosion.

It is the primary object of the present invention to avoid deformation or bursting of a primary battery cell due to excessive internal gas pressure and to avoid the corrosive influence of outside air entering the cell through a damaged cover.

This and other objects are accomplished in accordance with this invention by mounting a one-way venting valve in the air space between the active battery assembly and the cell container cover. The valve consists of two parts, a valve seat mounted concentrically about the electric current collector and conductor extending from the battery cathode outwardly of the open cell container top, and an annular valve body extending from the container inwardly towards, and into engagement with the valve seat. The valve seat is in contact with the depolarizing cathode. The valve parts consists of an insulating and elastic material chemically inert to the active battery assembly components, such as of plastic or rubber. Any gas pressure developing in the air space between the active battery assembly and the valve body causes the annular valve body to become disengaged from the valve seat and thus vents accumulating gases.

With such a one-way venting valve, it has been found possible to use an amalgamated powder zinc electrode containing less than 5%, by weight, of mercury without causing undue corrosion in the cell. Even a mercury addition of as little as 1% has been found sufficient.

As is conventional, the primary cell has an active battery assembly including a negative electrode, an electrolyte, and a positive electrode arranged in a container with an open top and the top is closed with a gas-permeable cover which defines an air space with the active battery assembly. The invention is particularly useful with the type of alkaline dry cell with a powdered zinc anode arranged concentrically about a depolarizing cathode and a centrally arranged electric current collector and conductor rod extending from the cathode outwardly of the open top of the container in a manner similar to the conventional Leclanche-type of battery cells.

The above and other objects, advantages, and features of the present invention will be more fully understood in connection with the following detailed description of a preferred embodiment thereof, taken in conjunction with the accompanying drawing wherein FIG. 1 is a vertical cross section of the valve body of the venting valve;

Figure 1A:
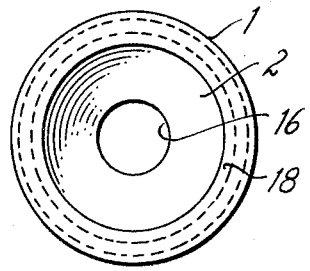
FIG. 1a is a top view of FIG. 1.
Figure 2A:
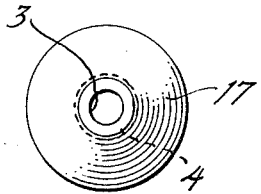
FIG. 2a is a top view of FIG. 2.
Figure 1:
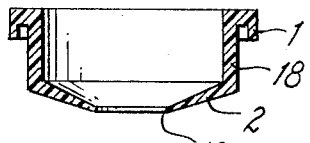
Figure 2:
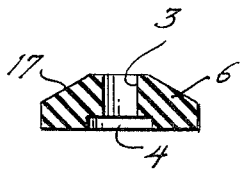
FIG. 2 is a vertical cross section of the valve seat.

Referring to the drawing, wherein like reference numerals designate like parts in all figures, the one valve part is shown to be a valve body having an annular portion 2 connected to a mounting rim 1 by a cylindrical portion 18. The annular valve body 2 is mounted on the upper edge of cell container 12 by rim 1 which fits over the container edge with the cylindrical portion 18 conforming to the container wall and the annular valve body extending from the container inwardly towards the valve seat 6.

The valve seat has a central bore 3 fitting over the central carbon rod 5 which is the electric current collector and conductor of the cell and extends from the depolarizing cathode 14 outwardly of the open top of the cell container. When assembled (see FIG. 3), the valve seat is mounted concentrically about carbon rod 5 and is in contact with the depolarizing cathode 14. The valve seat has a conical portion 17 and the annular valve body portion 2 is of sufficient thickness and elasticity to press with its inner edge 16 against the conical valve seat portion 17.

The valve seat has a central recess 4 which receives any minor amounts of electrolyte coming from the depolarizing cathode and thus prevents its leakage outside the valve seat.

The valve parts must be made of an insulating and elastic material which is chemically inert to the active battery assembly components and any reaction products of these components. Such synthetic resins as polyethylene or polyvinyl chloride, and such materials as natural or synthetic rubbers, for instance, neoprene, have been found useful as valve materials.

Figure 3:
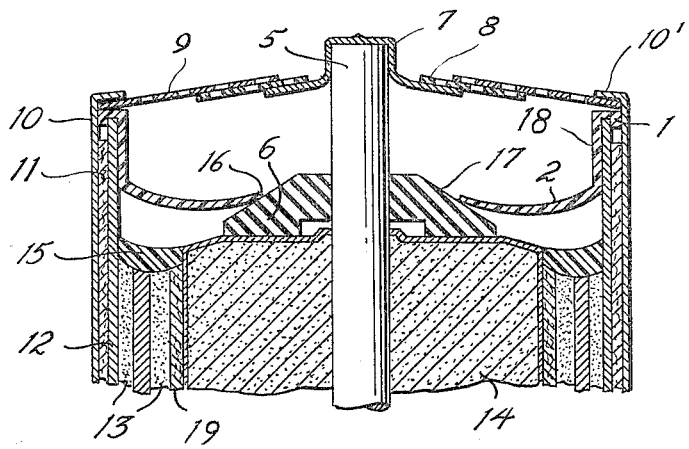
FIG. 3 is a vertical cross section of the upper portion of an alkaline dry cell incorporating the one-way valve of this invention.

The operation of the venting valve of this invention becomes obvious from a consideration of FIG. 3. As shown, the valve body edge 16 presses elastically, and under tension, against the valve seat, this pressure being adjustable by changing the dimensions and/or the elasticity of the valve material. In one preferred embodiment of the invention, the pressure of the valve body 2 on the valve seat is between about 0.2 atm. and 0.3 atm. This pressure constitutes the difference between the outer and inner pressures, which is permissible within the cell without causing damage thereto by deformation. If a gas pressure above this limit develops in the air spaces between the active battery assembly and the valve body 2, such excess pressure will cause the annular valve body 2 to become disengaged from the valve seat 17, thereby venting the excess gases outwardly through the air-permeable cover of the cell. On the other hand, no air from the outside can enter into the cell interior since the valve body edge 16 presses against the valve seat portion 17 and prevents entry of air therethrough.

As is obvious from a consideration of the drawing, the check valve of this invention is very simple in construction and may, therefore, be readily installed in mass manufacture of cells, any small deviations in valve dimensions being readily compensated by the elasticity of the valve body material.

As shown in FIG. 3, the cell is surrounded by a metallic jacket 10, for instance, of steel, which holds the cell container 12. A liquid-absorbent layer 11, for instance of absorbent paper, is arranged between the container 12 and the steel jacket 10 to absorb any electrolyte which may leak out of the container. The jacket has an inwardly extending upper rim portion 10' which presses against the rim 1 of the valve body and thus holds it in position, the gas-permeable cell cover being wedged between the rim portion 10' and the rim 1. The cover consists of an outer annular perforated disc 9, for instance, of nickel-plated steel, and an intermediate annular perforated disc 8, for instance, of polystyrene, mounted between the outer disc 9 and a nickel-plated brass cap 7 in contact with, and mounted on, the carbon rod 5.

The powdered zinc anode 13 constitutes the negative electrode of the active battery assembly and concentrically surrounds the depolarizing cathode 14, an electrolyte-carrying separator 19 being placed between the anode and the cathode, all of this battery structure being conventional.

In a preferred embodiment of a dry cell constructed in accordance with FIG. 3, the anode consists of zinc powder amalgamated with 3% to 4%, by weight, of mercury, the electrolyte consists of 35% of potassium hydroxide, 6% of zinc oxide, and 59% of water, all parts by weight, the depolarizer cathode is a bobbin of 23 parts of natural graphite and 72 parts of manganese dioxide, both by weight, 100 parts of the cathode mixture having been moistened with 12 parts of the electrolyte. The depolarizer bobbin may be enveloped with an alkali-resistant filter paper. A soft seal 15, for instance, of wax, may be arranged between the depolarizer bobbin and the container wall.

To assure the smooth operation of the check valve of this invention, the engaging portions 16, 17 of the valve body and seat may be lubricated, for instance, with a silicone lubricant.

Battery cells of the disclosed type have been stored for extended periods of time at elevated temperature without being in any way deformed. No bursting took place, of course. Nor was there any corrosion of the anode discovered, due to entry of air from the outside. Furthermore, all these advantages were accomplished while reducing the mercury content of the anode to less than 5%, in some instances to as little as 1%.

While the invention has been described in connection with a preferred embodiment, it will be clearly understood that many variations and modifications will occur to the skilled in the art, particularly after benefiting from the present disclosure, without departing from the spirit and scope of this invention, as defined in the appended claims.

I claim:
1. A primary battery cell comprising a container; an active battery assembly including a negative electrode, an electrolyte, and a positive electrode arranged in the container; a cover for the container, the cover defining an air space with the active battery assembly in the container; and a two-part valve mounted in the air space between the active battery assembly and the container cover, the two valve parts consisting of a valve seat and an impermeable check valve body normally biased into sealing relationship with the seat and adapted to be displaced therefrom for venting to the exterior through the permeable cover only upon development of excessive gas pressure in the active battery assembly and being composed of insulating and elastic material chemically inert to the active battery assembly components.

2. The primary battery cell of claim 1, wherein the valve seat has a conical wall mounted on the positive electrode and the valve body has a first portion attached to the upper edge of the container and extending downwardly therefrom in conforming relationship to the container wall and a second portion constituted by an inwardly extending annular flange extending from the first portion towards the conical wall of the one valve part, the flange pressing elastically against the conical wall.

3. The primary battery cell of claim 1, wherein the elastic material is a plastic.

4. The primary battery cell of claim 3, wherein the plastic is selected from the group consisting of polyethylene and polyvinyl chloride.

5. The primary battery cell of claim 1, wherein the elastic material is selected from the group consisting of natural and synthetic rubber.

6. The primary battery cell of claim 1, wherein the negative electrode is a powdered zinc anode and the electrolyte is alkaline.

7. The primary battery cell of claim 6, wherein the powdered zinc is amalgamated and contains less than 5%, by weight, of mercury.

8. An alkaline primary battery cell comprising a metallic container having an open top; an active battery assembly arranged in the container, the assembly including a powdered zinc anode, an alkaline electrolyte, and a depolarizing cathode, the anode being arranged concentrically about the cathode and a centrally arranged electric current collector and conductor extending from the cathode outwardly of the open top of the container; a gas-permeable cover mounted over the open top of the container and including an electrically conductive cap in contact with the electric current collector and conductor, the cover defining an air space with the active battery assembly in the container; and a one-way valve mounted in the air space between the active battery assembly and the container cover, the valve consisting of a valve seat mounted concentrically about the electric current collector and conductor, and being in contact with the depolarizing cathode, and an annular valve body extending from the container inwardly towards, and into engagement with, the valve seat, the valve seat and body consisting of an insulating and elastic material chemically inert to the active battery assembly components, any gas pressure developing in the air space between the assembly and the valve body causing the annular valve body to become disengaged from the valve seat.

9. A primary battery cell comprising a metallic container having an open top; an active battery assembly arranged in the container, the assembly including an anode, an electrolyte, and a depolarizing cathode, the anode being arranged concentrically about the cathode and a centrally arranged electric current collector and conductor extending from the cathode outwardly of the open top of the container; a gas-permeable cover mounted over the open top of the container and including an electrically conductive cap in contact with the electric current collector and conductor, the cover defining an air space with the active battery assembly in the container; and a one-way valve mounted in the air space between the active battery assembly and the container cover, the valve consisting of a valve seat mounted concentrically about the electric current collector and conductor, and being in contact with the depolarizing cathode, and an annular valve body extending from the container inwardly towards, and into engagement with, the valve seat, the valve seat and body consisting of an insulating and elastic material chemically inert to the active battery assembly components, any gas pressure developing in the said space between the assembly and the valve body causing the annular valve body to become disengaged from the valve seat.

10. In a primary battery cell comprising a central conductor, an active battery assembly and a container therefor, with the cover of the container spaced at one end from said assembly and with the adjoining impermeable wall extending beyond said assembly to define therewith and with said electrode an annular air space within said container, a portion of the cover permitting flow of gas in either direction between said air space and the exterior, annular venting valve means positioned in said air space between said container cover and said assembly and about said conductor, said valve means comprising a fixed annular seat surrounding the conductor and a movable resilient annular body extending from sealing contact with the surrounding container wall into resilient contact with the seat at a location thereon facing said cover rather than said assembly, said valve means thereby being normally closed but openable in response to the pressure of gas evolved from said assembly to vent the same to the exterior through said permeable cover.

11. The apparatus of claim 10 further characterized in that said valve when closed seals off said air space into two separate portions, one of which is contiguous with said assembly and the other of which is contiguous with said permeable cover, and when open establishes communication between said portions.

References Cited by the Examiner

UNITED STATES PATENTS

| | | | |
|---|---|---|---|
| 1,650,319 | 11/1927 | Briggs | 136—177.9 |
| 2,000,510 | 5/1935 | Corigliano | 136—133 |
| 2,060,832 | 11/1936 | Smith | 136—177.9 |
| 2,179,816 | 11/1939 | Drummond | 136—133 |
| 2,993,947 | 7/1961 | Leger | 136—107 |
| 3,090,824 | 5/1963 | Reilly et al. | 136—177 |

WINSTON A. DOUGLAS, *Primary Examiner.*

MURRAY TILLMAN, *Examiner.*

D. L. WALTON, *Assistant Examiner*